US009967124B2

(12) United States Patent
Thomas et al.

(10) Patent No.: US 9,967,124 B2
(45) Date of Patent: *May 8, 2018

(54) USE OF BASIS FUNCTIONS FOR TRANSMISSION OF BROADCAST CONTROL INFORMATION IN A WIRELESS NETWORK

(71) Applicant: NOKIA SOLUTIONS AND NETWORKS OY, Espoo (FI)

(72) Inventors: Timothy Thomas, Palatine, IL (US); Frederick Vook, Schaumburg, IL (US); Rapeepat Ratasuk, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 49 days.

This patent is subject to a terminal disclaimer.

(21) Appl. No.: 14/716,333

(22) Filed: May 19, 2015

(65) Prior Publication Data

US 2015/0280802 A1    Oct. 1, 2015

Related U.S. Application Data

(63) Continuation-in-part of application No. PCT/US2014/031870, filed on Mar. 26, 2014, and a
(Continued)

(51) Int. Cl.
*H04H 20/71* (2008.01)
*H04L 27/26* (2006.01)
(Continued)

(52) U.S. Cl.
CPC ......... *H04L 27/2636* (2013.01); *H04B 7/063* (2013.01); *H04B 7/0695* (2013.01); *H04L 5/0053* (2013.01)

(58) Field of Classification Search
None
See application file for complete search history.

(56) References Cited

U.S. PATENT DOCUMENTS 6,680,699 B2 * 1/2004 Voyer .................. H04B 7/0848
342/378
7,057,573 B2 * 6/2006 Ohira ...................... H01Q 3/22
343/817
(Continued)

FOREIGN PATENT DOCUMENTS

GB            2343322 A  *  5/2000  .......... H04N 19/172

OTHER PUBLICATIONS

International Search Report and Written Opinion for PCT Application PCT/EP2016/060717, dated Aug. 1, 2016, 14 pages.
(Continued)

*Primary Examiner* — Michael J Moore, Jr.
(74) *Attorney, Agent, or Firm* — Brake Hughes Bellermann LLP

(57) ABSTRACT

An example technique may include: receiving, by a mobile station from a base station, a plurality of copies of a broadcast information including a broadcast control message, wherein a copy of the broadcast information is transmitted via each of a plurality of basis function beams; determining, by the mobile station, a gain and phase value for each copy of at least a subset of the plurality of the received copies of the broadcast control message transmitted via different basis function beams. The technique may also include, for example, determining, by the mobile station, a combined broadcast control message based on at least the subset of the plurality of the received copies of the broadcast control message and the gain and phase value for each copy of at least the subset of the plurality of the received copies of the broadcast control message.

33 Claims, 9 Drawing Sheets

Related U.S. Application Data continuation-in-part of application No. 14/617,235, filed on Feb. 9, 2015, now Pat. No. 9,331,767.

(51) Int. Cl.
*H04B 7/06* (2006.01)
*H04L 5/00* (2006.01)

(56) References Cited

U.S. PATENT DOCUMENTS

| | | | | |
|---|---|---|---|---|
| 7,720,509 | B2* | 5/2010 | Famolari | H04B 7/0617 |
| | | | | 343/893 |
| 8,243,707 | B2* | 8/2012 | Choi | H04B 7/0452 |
| | | | | 370/342 |
| 8,526,892 | B2* | 9/2013 | Zhang | H04B 7/0413 |
| | | | | 370/334 |
| 2002/0051430 | A1 | 5/2002 | Kasami et al. | |
| 2004/0091055 | A1* | 5/2004 | Williams | H04L 27/2601 |
| | | | | 375/259 |
| 2007/0207730 | A1 | 9/2007 | Nguyen et al. | |
| 2007/0230373 | A1 | 10/2007 | Li et al. | |
| 2008/0051145 | A1* | 2/2008 | Jin | H04B 7/022 |
| | | | | 455/561 |
| 2008/0143571 | A1* | 6/2008 | Sojka | G01S 13/951 |
| | | | | 341/144 |
| 2010/0008433 | A1* | 1/2010 | Huang | H04L 5/0007 |
| | | | | 375/260 |
| 2013/0170452 | A1* | 7/2013 | Kwon | H04W 72/04 |
| | | | | 370/329 |
| 2015/0009951 | A1* | 1/2015 | Josiam | H04L 25/0224 |
| | | | | 370/330 |
| 2016/0119038 | A1* | 4/2016 | Thomas | H04B 7/043 |
| | | | | 370/329 |
| 2016/0142117 | A1* | 5/2016 | Rahman | H04B 7/0469 |
| | | | | 375/267 |

OTHER PUBLICATIONS

Thomas, et al., "Method for Obtaining Full Channel State Information for RF Beamforming", Thomas, et al.; "Method for Obtaining Full Channel State Information for RF Beamforming"; Globecom 2014—Wireless Communications Symposium; IEEE; pp. 3496-3500.

Alamouti, Siavash M., "A Simple Transmit Diversity Technique for Wireless Communications", IEEE Journal on Select Areas in Communications, vol. 16, No. 8, pp. 1451-1458, Oct. 1998.

Vook, Frederick W. et al., "Transmit Diversity Schemes for Broadband Mobile Communication Systems", 7 pages, Sep. 24, 2000.

Berardinelli, Gilberto et al., "Zero-tail DFT-spread-OFDM signals", 6 pages, 2013.

\* cited by examiner

USE OF BASIS FUNCTIONS FOR TRANSMISSION OF BROADCAST CONTROL INFORMATION IN A WIRELESS NETWORK

PRIORITY CLAIM

This application claims priority to PCT patent application number PCT/US2014/031870, filed on 26 Mar. 2014, entitled "Radio Frequency Beamforming Basis Function Feedback", and U.S. patent application Ser. No. 14/617,235, filed on Feb. 9, 2015, entitled "Translation of Basis Functions For Feedback In A Wireless Network", both of which are incorporated by reference herein.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed.

SUMMARY

According to an example implementation, a method may include transmitting, by a base station, multiple copies of a broadcast information including a broadcast control message, wherein a copy of the broadcast information is transmitted via each of a plurality of basis function beams.

According to another example implementation, an apparatus may include at least one processor and at least one memory including computer instructions, when executed by the at least one processor, cause the apparatus to: transmit, by a base station, multiple copies of a broadcast information including a broadcast control message, wherein a copy of the broadcast information is transmitted via each of a plurality of basis function beams.

According to another example implementation, a computer program product may include a computer-readable storage medium and storing executable code that, when executed by at least one data processing apparatus, is configured to cause the at least one data processing apparatus to perform a method including: transmitting, by a base station, multiple copies of a broadcast information including a broadcast control message, wherein a copy of the broadcast information is transmitted via each of a plurality of basis function beams.

According to another example implementation, an apparatus may include means for transmitting, by a base station, multiple copies of a broadcast information including a broadcast control message, wherein a copy of the broadcast information is transmitted via each of a plurality of basis function beams.

According to another example implementation, a method may include receiving, by a mobile station from a base station, a plurality of copies of a broadcast information including a broadcast control message, wherein a copy of the broadcast information is transmitted via each of a plurality of basis function beams, determining, by the mobile station, a gain and phase value for each copy of at least a subset of the plurality of the received copies of the broadcast control message transmitted via different basis function beams, and determining, by the mobile station, a combined broadcast control message based on at least the subset of the plurality of the received copies of the broadcast control message and the gain and phase value for each copy of at least the subset of the plurality of the received copies of the broadcast control message.

According to another example implementation, an apparatus may include at least one processor and at least one memory including computer instructions, when executed by the at least one processor, cause the apparatus to: receive, by a mobile station from a base station, a plurality of copies of a broadcast information including a broadcast control message, wherein a copy of the broadcast information is transmitted via each of a plurality of basis function beams, determine, by the mobile station, a gain and phase value for each copy of at least a subset of the plurality of the received copies of the broadcast control message transmitted via different basis function beams, and determine, by the mobile station, a combined broadcast control message based on at least the subset of the plurality of the received copies of the broadcast control message and the gain and phase value for each copy of at least the subset of the plurality of the received copies of the broadcast control message.

According to an example implementation, a computer program product may include a computer-readable storage medium and storing executable code that, when executed by at least one data processing apparatus, is configured to cause the at least one data processing apparatus to perform a method including: receiving, by a mobile station from a base station, a plurality of copies of a broadcast information including a broadcast control message, wherein a copy of the broadcast information is transmitted via each of a plurality of basis function beams, determining, by the mobile station, a gain and phase value for each copy of at least a subset of the plurality of the received copies of the broadcast control message transmitted via different basis function beams, and determining, by the mobile station, a combined broadcast control message based on at least the subset of the plurality of the received copies of the broadcast control message and the gain and phase value for each copy of at least the subset of the plurality of the received copies of the broadcast control message.

According to another example implementation, an apparatus may include means for receiving, by a mobile station from a base station, a plurality of copies of a broadcast information including a broadcast control message, wherein a copy of the broadcast information is transmitted via each of a plurality of basis function beams, means for determining, by the mobile station, a gain and phase value for each copy of at least a subset of the plurality of the received copies of the broadcast control message transmitted via different basis function beams, and means for determining, by the mobile station, a combined broadcast control message based on at least the subset of the plurality of the received copies of the broadcast control message and the gain and phase value for each copy of at least the subset of the plurality of the received copies of the broadcast control message.

The details of one or more examples of implementations are set forth in the accompanying drawings and the description below. Other features will be apparent from the description and drawings, and from the claims.

DETAILED DESCRIPTION

Figure 1:
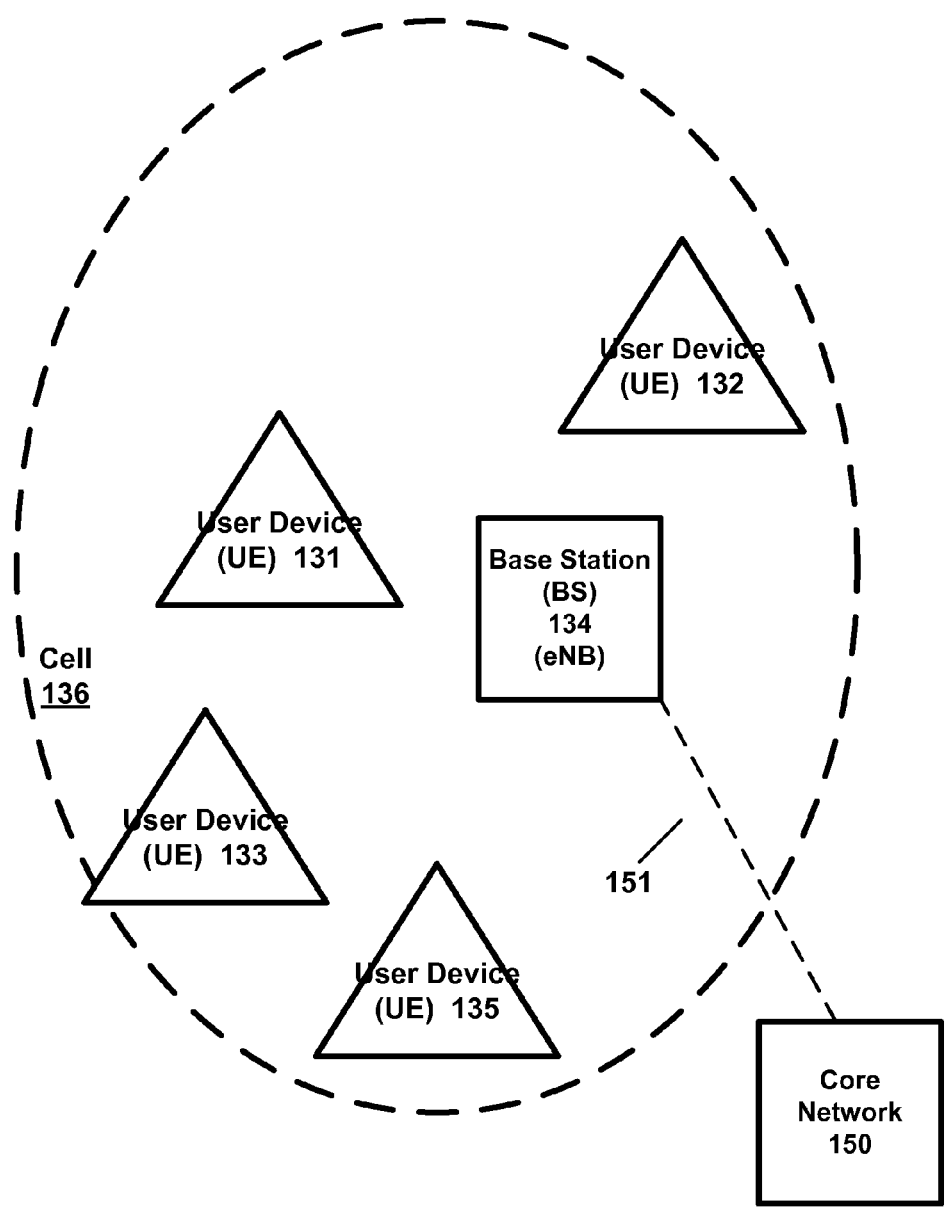
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user equipments (UEs), may be connected (and in communication) with a base station (BS) 134, which may also be referred to as an enhanced Node B (eNB). At least part of the functionalities of a base station or (e)Node B (eNB) may be also be carried out by any node, server or host which may be operably coupled to a transceiver, such as a remote radio head. BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, and/or mmWave band networks, or any other wireless network. LTE, 5G and mmWave band networks are provided only as illustrative examples, and the various example implementations may be applied to any wireless technology/wireless network.

One challenge that exists is transmitting broadcast information, e.g., broadcast control information, to a group of mobile stations (MSs) when using RF (radio frequency) beamforming. In some example situations, beamforming may use directional beams. However, in many cases, directional beamforming is not well suited for broadcasting a message to multiple users/MSs, because the MSs are typically spread out geographically. Thus, due to the diverse location of a group of MSs, each MS may ideally be served by a BS by using a unique beam (or a unique or MS-specific set of beamforming weights applied to a transmission antenna to generate a MS-specific beam pointed to the MS). Furthermore, in some situations, the BS may not know the location of one or more of the MSs nor where to point beam because many users/MSs accessing (or receiving) the broadcast control message from the BS are not yet registered with the BS/network, for example.

Therefore, according to an example implementation, a base station (BS) may transmit (or sound) a copy of a broadcast information, e.g., which may include sounding signals and a broadcast control message, via each of a plurality of orthogonal basis function beams (e.g., broadcast control information is transmitted across each of a plurality of orthogonal directions).

According to an example implementation, the broadcast control message may include any broadcast control information. For example, the broadcast control message may include information transmitted via a broadcast channel or a broadcast control channel, or via a physical broadcast channel (PBCH). By way of example, a broadcast control message may include broadcast control information, such as: radio resource control (RRC) system information messages, which a BS may broadcast across a cell or network to inform MSs about how the cell is configured. For example, the system information included in the broadcast control message may include a master information block (MIB) and one or more system information blocks (SIBs). The MIB may, for example, include a field indicating a system bandwidth for the cell, a field used for physical hybrid ARQ (automatic repeat request) indicator channel, and a system frame number. These fields of the MIB may be used by a MS, for example, to perform synchronization or decode signals from the BS/cell. SIB may include, for example: SIB1 may include cell access related parameters and scheduling of other SIBs; SIB2 may include common and shared channel configuration, RACH (random access channel) related configuration information; other SIBs may include information such as parameters required for cell reselection, information regarding neighboring cells, etc. The MIB and SIB information are examples of broadcast control information. However, the broadcast control message(s) may include other types of control information, such as information announcing the scheduling of uplink or downlink resources (e.g., resource assignments/allocations), and other broadcast control information.

Therefore, as noted, a BS may transmit (or sound) a copy of a broadcast information, e.g., which may include sounding signals and a broadcast control message, via each of a plurality of orthogonal basis function beams. According to an example implementation, the sounding signals may be a known pilot sequence or known reference signals, or other sounding signals that are known by both the BS and multiple receiving mobile stations (MSs). For example, the BS may transmit multiple copies of a broadcast information including a broadcast control message, wherein a copy of the broadcast message is transmitted via each of a plurality of basis function beams of a set of orthogonal basis function beams. The MS may determine a best/dominant $M_B$ basis functions/basis function beams (or best $M_B$ control messages or $M_B$ best/dominant copies of the broadcast control messages), e.g., by selecting the $M_B$ basis functions (or basis function beams) which may be the sounding signals (basis functions) having a highest amplitude or power, for example. The MS may then determine a gain and phase value for each of the $M_B$ best/dominant basis functions/$M_B$ broadcast control messages. The MS may then determine or calculate a combined broadcast control message based on the received copies of the $M_B$ best/dominant broadcast control messages and the gain and phase value for each of the $M_B$ best/dominant broadcast control messages.

For example, the MS may determine a combined broadcast control message as a weighted sum of the $M_B$ broadcast control messages that have been weighted (or multiplied by) their gain and phase value. For example, $M_B$ may be a number (e.g., subset) that may be the same as or less than the number of beams in the set of orthogonal basis function beams. According to an example implementation, at least in some cases, a MS may be able to determine a combined broadcast control message that may be the same as or very similar to (e.g., may have same or very similar properties (e.g., amplitude) as) a broadcast control message that was transmitted by the BS to the MS via a directional beam (directionally beamformed) specific to the MS (or via a directional beam based on the MS-BS channel). Thus, at least in some cases, the combined broadcast control message may be the same as or very similar to receiving the broadcast control message via an optimal RF beamformer for the MS.

According to an example implementation, these illustrative techniques may be applied to multiple MSs within a network based on a BS transmitting (broadcasting) the broadcast information via each of the orthogonal basis function beams. According to an example implementation, in this manner, rather than transmitting the broadcast control information via a MS-specific directional beam to each MS (which may not even be possible in some cases), a BS may broadcast (e.g., to all nearby MSs) a copy of a same broadcast information (e.g., including sounding signals and a broadcast control message) via a plurality of orthogonal basis function beams. Each MS may then determine its $M_B$ best/dominant basis functions (or basis function beams) or $M_B$ best/dominant broadcast control messages, and a gain and phase value for each of the $M_B$ best/dominant basis function beams or $M_B$ broadcast control messages, and then generate a combined broadcast control message that may be the same as or very similar to the broadcast control message received by each MS via an optimal beamformer (e.g., MS-specific beamforming weights applied at the BS based on the MS-BS channel) for each MS. The $M_B$ best/dominant basis functions (or basis function beams) or $M_B$ best/dominant broadcast control messages may be different for the different MSs, e.g., due to different geographical location of the MSs. For example, these example techniques may allow each of multiple MSs to determine a combined broadcast control message based on (potentially) a different subset of received control messages, with each copy of the control message transmitted via a basis function beam of a set of orthogonal basis function beams.

Figure 2:
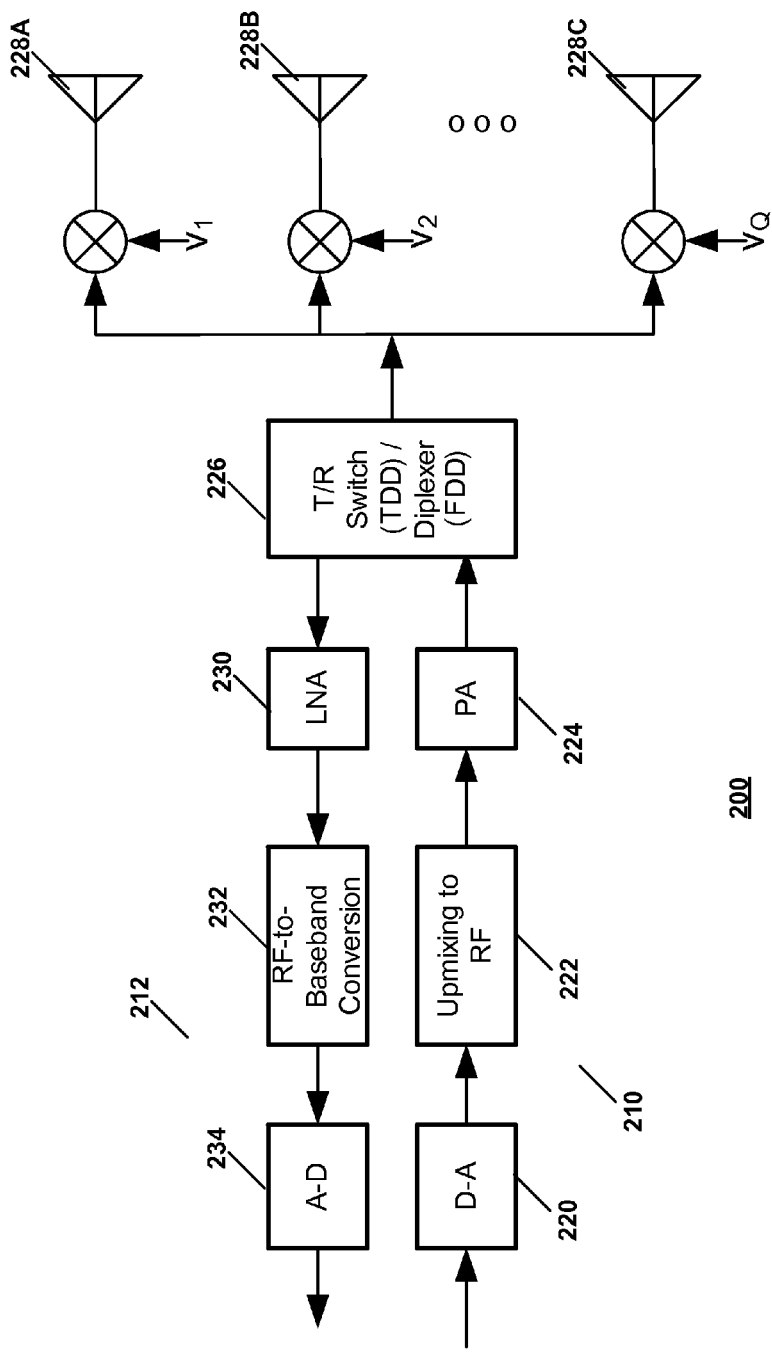
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights $V_1, V_2, \ldots$ or $V_Q$ is mixed with the signal to apply a gain and phase to the signal for transmission. For example, a gain and phase, $V_1, V_2, \ldots$ or $V_Q$, may be applied to the signal output from the T/R switch 226 to scale the signal transmitted by each antenna (e.g., the signal is multiplied by $V_1$ before being transmitted by antenna 1 228A, the signal is multiplied by $V_2$ before being transmitted by antenna 2 228B, and so on), where the phase may be used to steer or point a beam transmitted by the overall antenna array, e.g., for directional beam steering. Thus, the beam weights $V_1, V_2, \ldots$ or $V_Q$ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

In some cases, it may be desirable to obtain the full channel knowledge at a radio frequency (RF) millimeter (mmWave) beamforming transmitter. One challenge or difficulty with employing baseband array processing at mmWave is that the analog to digital (A-D) converters and digital to analog (D-A) converters consume an unacceptable amount of power because of the large bandwidths of mmWave systems (e.g., bandwidths of 1-2 GHz as opposed to 20 MHz for traditional cellular frequencies).

The relatively large power consumption of the D-A and A-D converters means that the number of A-D and D-A converters should, at least in some cases, be decreased or minimized in mmWave and, as a result, traditional array processing at baseband may not be viable, or may at least be less viable.

Hence it may not be practical to provide a full baseband transceiver behind each antenna as required by traditional array processing at baseband, so instead a single or a small number of baseband paths may be available for beamforming to an RF beamforming array as illustrated in FIG. 2 (for a single baseband path for all Q elements). In particular, FIG. 2, as an example, illustrates RF beamforming with a single RF beamformer and a single baseband path (one baseband unit for Q total antennas). Other configurations may be provided as well.

One example goal of channel estimation may be to obtain the gain and phase of the channel between each transmit (Tx) antenna element and each receive (Rx) antenna element. With a separate baseband path behind each element, the full channel between a transmitter and a receiver can be obtained. According to an example implementation, this problem may be solved in traditional cellular systems, such as long term evolution (LTE), by sending pilots from each Tx (transmit) antenna separately, receiving them all at the same time on each Rx (receive) antenna, and then using a channel estimator to obtain the full channel. Complicating matters at mmWave is that the receiver will be receiving any pilot transmission from the transmitter with a RF receiver beamformer. The result is that even if a single transmit antenna is sounded, the received signal will not be to a single receive antenna but an aggregated signal from multiple receive antennas. The approach of sounding each Tx antenna separately and listening on each Rx antenna separately may not necessarily be practical, at least in some cases, since there will be no beamforming gain to overcome the path loss so a very long sounding period may be needed to overcome the path loss (i.e., the use of very long spreading codes).

The following description will use, by way of illustrative example, the Tx (transmit or transmitter) and Rx (receive or receiver) having the configuration shown in FIG. 2 with a single Tx and Rx RF beam weight vector, but this is merely one illustrative simple example, and other configurations may be used. It will be assumed that the Tx array is (or may be) an M×M array ($M^2$ total antennas) and the Rx array is an N×N array ($N^2$ total antennas) where both arrays have uniform spacing of antennas in each dimension (e.g., 0.5 wavelength spacing), for example. However, embodiments are not limited to this configuration and this concept can easily be applied to one-dimensional arrays, rectangular arrays of size $M_h \times M_v$ for the Tx and $N_h \times N_v$ for the Rx, circular arrays, and any other arbitrary array.

One illustrative example implementation may include sending a (same) broadcast information, e.g., including sounding waveforms (e.g., a pilot sequence or reference signals) and a broadcast control message, using $Q=M^2$ orthogonal transmit basis functions (where a basis function can be viewed as a transmit beam weight vector or transmit beam). The MS or receiver may then determine dominant (the basis function beams having the highest amplitude) $M_B$ basis functions, e.g., based on the received sounding signals for each basis function beam. The MS may then determine a gain and phase value for each of the $M_B$ basis functions/broadcast control messages. The MS may determine a combined broadcast control message based on the $M_B$ broadcast control messages (or broadcast control message copies) and the gain and phase value for each basis function beam or for each copy of the broadcast control message received via a different basis function beam. The MS or receiver may also send feedback to the BS or transmitter that identifies the $M_B$ dominant basis functions (or basis function beams) and the gain and phase value for each of these $M_B$ basis functions/broadcast control messages. The feedback may then be used to determine the actual channel between each transmit antenna and the best beam at the receiver as described below. Note, however, in general that $B_f$ transmit basis functions can be used instead of $Q=M^2$ transmit basis functions. For example, if the deployment scenario is such that no receiver will ever be located at certain azimuth and/or elevation angles relative to the Tx array, then $B_f < Q$ basis functions may be used which will reduce system overhead by reducing the number of basis functions which need to be sounded.

Therefore, as noted, basis function beams may be useful in allowing the BS to obtain feedback from each MS which provides a transmitter/BS with full channel information (i.e., the channel between each transmit antenna and each receive antenna) when the transmitter is employing RF beamforming. Also, transmitting a copy of a broadcast information via each basis function beam of a set of orthogonal basis function beams may allow each MS to determine a combined broadcast control message with similar properties (e.g., amplitude) as if the broadcast control message was sent to the MS via an optimal beamformer for the MS, without requiring the BS to transmit the broadcast control message to each MS via an optimal beamformer for each MS.

Figure 3:
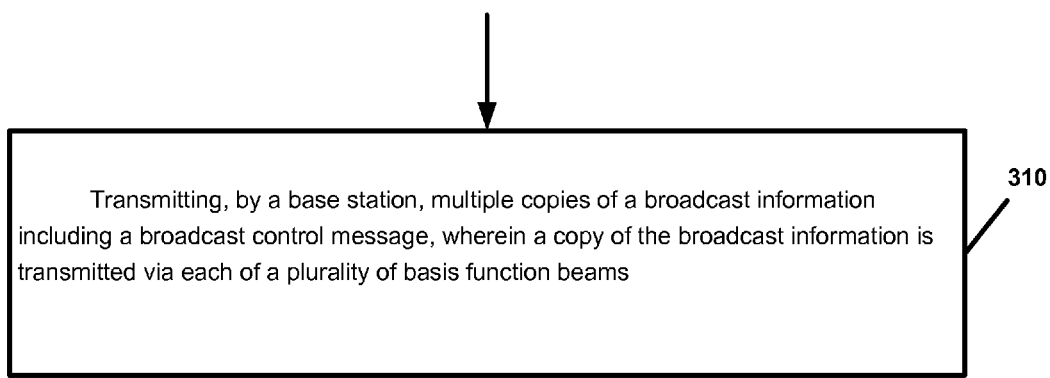
FIG. 3 is a flowchart illustrating operation of a base station according to an example implementation.

FIG. 3 is a flowchart illustrating operation of a base station according to an example implementation. Operation 310 includes transmitting, by a base station, multiple copies of a broadcast information including a broadcast control message, wherein a copy of the broadcast information is transmitted via each of a plurality of basis function beams.

According to an example implementation of the method of FIG. 3, the method may further include receiving, by the base station from a mobile station in response to the transmitting, feedback signals (feedback information) indicating a gain and phase value for each of a plurality of dominant basis function beams of the plurality of basis function beams, and determining, based on the feedback signals, a set of beamforming weights optimized for the mobile station.

According to an example implementation of the method of FIG. 3, the transmitting may include transmitting by a base station a broadcast information including a set of sounding signals and a broadcast control message via each of a plurality of orthogonal basis function beams.

According to an example implementation of the method of FIG. 3, the base station includes two or more sets of antennas, wherein the transmitting may include transmitting, by the base station, a broadcast information that is space-time coded across the two or more sets of antennas.

According to an example implementation of the method of FIG. 3, wherein the method further includes transmitting, by the base station to the mobile station, beamformed data based on the set of beamforming weights.

According to an example implementation of the method of FIG. 3, the receiving may include: receiving, by the base station from a first mobile station in response to the transmitting, feedback signals specific to the first mobile station that include a gain and phase value for each of a plurality of dominant basis function beams that are dominant for the first mobile station; and receiving, by the base station from a second mobile station in response to the transmitting, feedback signals specific to the second mobile station that include a gain and phase value for each of a plurality of dominant basis function beams that are dominant for the second mobile station. According to an example implementation, this method may further include: determining, based on the feedback signals specific to the first mobile station, a first set of beamforming weights optimized for the first mobile station; and determining, based on the feedback signals specific to the second mobile station, a second set of beamforming weights optimized for the second mobile station.

According to an example implementation of the method of FIG. 3, the transmitting may include transmitting a broadcast information that includes a set of sounding signals and a broadcast control message via a set of orthogonal basis function beams, the base station applying an individual gain and phase weighting to each of Q antennas to transmit a copy of the broadcast information via each beam of the set of orthogonal basis function beams.

According to an example implementation of the method of FIG. 3, the plurality of basis function beams are derived from a discrete Fourier transform (DFT) matrix.

According to an example implementation of the method of FIG. 3, the broadcast information may be sent from the basis function beams in a pre-determined order where the mobile station could use this knowledge when indicating which are the dominant basis function beams for that mobile station.

Figure 4:
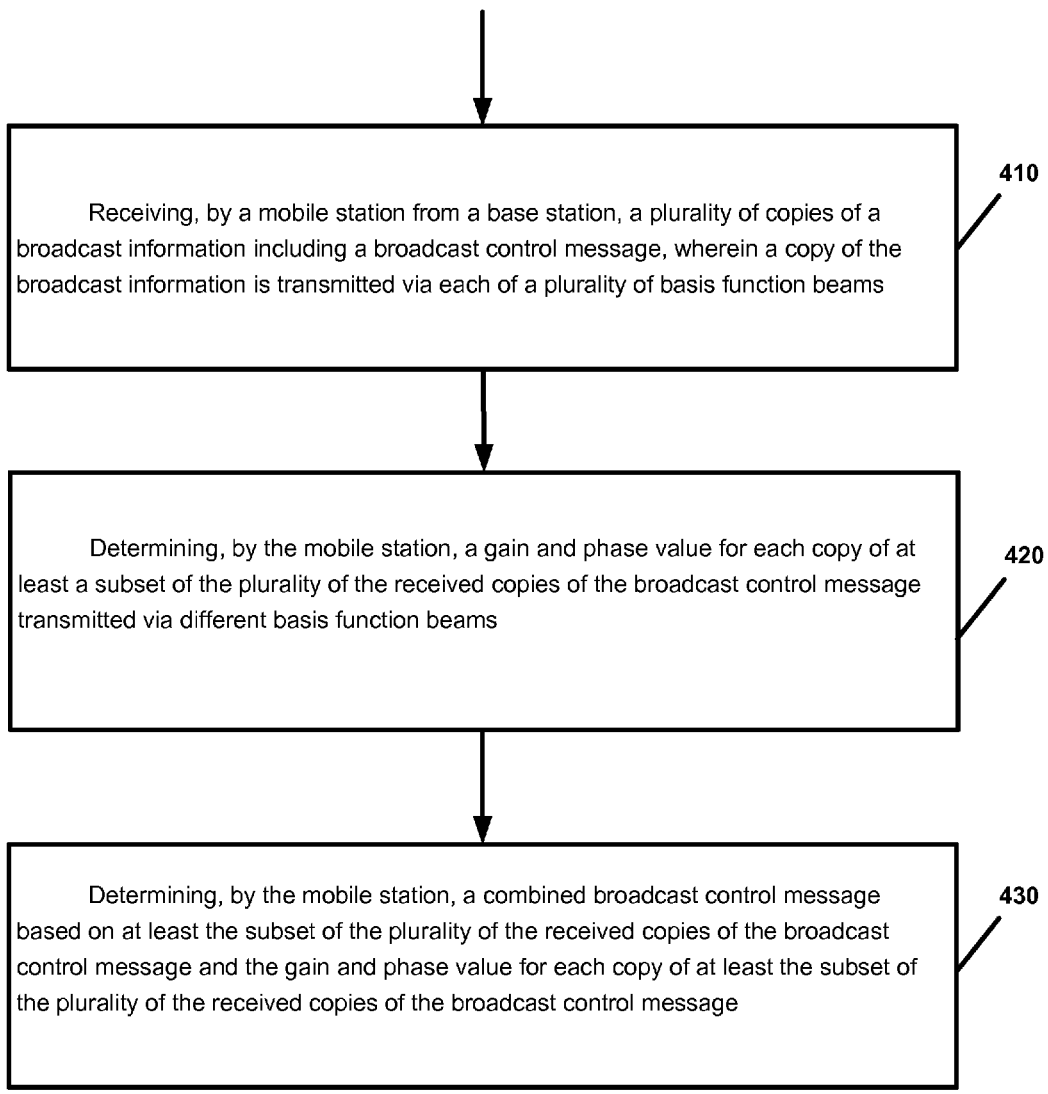
FIG. 4 is a flowchart illustrating operation of a mobile station according to an example implementation.

FIG. 4 is a flowchart illustrating operation of a mobile station according to an example implementation. Operation 410 may include receiving, by a mobile station from a base station, a plurality of copies of a broadcast information including a broadcast control message, wherein a copy of the broadcast information is transmitted via each of a plurality of basis function beams. Operation 420 includes determining, by the mobile station, a gain and phase value for each copy of at least a subset of the plurality of the received copies of the broadcast control message transmitted via different basis function beams. And, operation 430 includes determining, by the mobile station, a combined broadcast control message based on at least the subset of the plurality of the received copies of the broadcast control message and the gain and phase value for each copy of at least the subset of the plurality of the received copies of the broadcast control message.

According to an example implementation of the method of FIG. 4, the method may further include decoding, by the mobile station, the combined broadcast control message.

According to an example implementation of the method of FIG. 4, each copy of the broadcast control message is transmitted via a different basis function beam of a set of orthogonal basis function beams.

According to an example implementation of the method of FIG. 4, the determining a gain and phase value for each copy of at least a subset of the plurality of the received copies of the broadcast control message may include: determining, based on an amplitude of at least a portion of each received copy of the broadcast information, a dominant subset of the plurality of the received copies of the broadcast control message; and determining a gain and phase value for each copy of the dominant subset of the plurality of the received copies of the broadcast control message.

According to an example implementation of the method of FIG. 4, the determining a combined broadcast control message may include determining a combined broadcast control message as a sum of the subset of the plurality of the weighted received copies of the broadcast control message, where each received copy is weighted by its gain and phase value.

According to an example implementation of the method of FIG. 4, the method may further include sending, from the mobile station to the base station, a feedback signal identifying a plurality of best or dominant basis functions and a gain and phase value for each of the plurality of dominant basis functions.

According to an example implementation of the method of FIG. 4, the receiving may include receiving, by a mobile station from a base station, a plurality of copies of a broadcast information, each copy of the broadcast information including a set of sounding signals and a broadcast control message transmitted via a different basis function beam of a set of orthogonal basis function beams; and wherein the determining a gain and phase value comprises determining a gain and phase value for at least a subset of the basis function beams based on the copy of the sounding signals received via each of a plurality of the basis function beams.

According to an example implementation of the method of FIG. 4, the method may further include determining, by the mobile station, a best or most dominant copy of the broadcast control message; determining, by the mobile station, that the mobile station cannot decode the best copy of the broadcast control message; and the mobile station performing the following in response to determining that the mobile station cannot decode the best copy of the broadcast control message: determining the combined broadcast control message based on at least the subset of the plurality of the received copies of the broadcast control message and the gain and phase value for each copy of at least the subset of the plurality of the received copies of the broadcast control message; and decoding the combined broadcast control message.

According to an example implementation of the method of FIG. 4, the broadcast information may be sent from the basis function beams in a pre-determined order where the mobile station could use this knowledge when indicating which are the dominant basis function beams for that mobile station.

According to example implementations, two types of basis function beams are considered as examples. The first is directional or highly-directional beams (or narrow-beams) where it may be likely that the mobile station would only detect a few dominant basis function beams (i.e., $M_B$, the number of dominant basis function beams, is small), where non-dominant beams may have a zero or near-zero amplitude. A dominant basis function beam may be a beam having an amplitude/power greater than a threshold value (e.g., all beams which are received within 10 dB of the strongest beam), and there are $M_B$ dominant basis function beams, where $M_B$ may vary. A second option is using near-omnidirectional basis function beams where the mobile station may determine or measure that each beam as being approximately equally good or having a similar amplitude/power, for example.

One or more illustrative example implementations may allow or provide one or more of the following: 1) Transmitting (by a BS) the same broadcast control message and sounding signals (e.g., pilots/pilot sequences) from (or via) multiple basis functions (multiple basis function beams) to obtain a near-optimal RF beamforming gain at a MS while in broadcast mode (while the BS broadcasts information); 2) Receiving (by a MS) a repetition (or multiple copies) of the broadcast control message and sounding signals/pilots via (or from) multiple basis functions (or multiple basis function beams), determining a gain and phase value for each basis function beam from each of the pilot sequences/set of sounding signals that re-create an optimal beamforming weight, and then combining the repeated multiple broadcast control message with optimal gain and phase values to obtain a near-optimal RF beamforming gain for decoding the broadcast control message; and 3) in one example implementation, possibly transmitting the broadcast information using a space-time code (such as the Alamouti code) across two cross-polarized arrays within a sector.

Various example implementations may provide techniques for transmitting broadcast control information from a single RF array or a pair of RF arrays (which may include orthogonal polarization). Example Tx (transmitter, or BS) and Rx (receiver or MS) configurations considered are shown in FIG. 2, as an example. It will be assumed that the Tx array may, for example, be an M×M array ($M^2$ total antennas) where the array has a uniform spacing of antennas in each dimension (e.g., 0.5 wavelength spacing). The techniques may also be applied to one-dimensional arrays and arbitrary arrays as well.

According to an example implementation, a transmitter or BS may repeat the transmission of a same broadcast control message from $M^2$ orthogonal transmit basis functions (where a basis function can be viewed as a transmit weight vector or beam), and then the receiver or MS may combine the broadcast control messages received from all or just the dominant $M_B$ basis functions. The use of basis function beams offer a minimum sounding set since only orthogonal beams are used instead of a dense grid of beams. The use of orthogonal beams means that only a number of beams that is no more than the total number of transmit antenna elements is necessary to transmit/sound and yet still allow the receiver/MS to obtain full channel knowledge which enables the receiver to re-create a signal as if it were sent from the optimal beamforming beam for that receiver/MS. Using a dense grid of beams does not give full channel knowledge (but can get close with a dense enough grid) and requires a larger number of beams (e.g., around 4× the number of antenna elements just to get within about 1.0 dB of the optimal beamforming gain). Through determining (by the MS) how to combine the $M_B$ basis functions, the receiver/MS also determines the gains and phases (gain and phase value) for the basis functions which when fed back to the transmitter/BS can be used for later dedicated transmissions to the receiver/MS.

For example, for a two dimensional array with M antennas in each dimension, basis functions may first be chosen for each dimension (i.e., azimuth or elevation), and then the set of overall basis functions may be formed as the Kronecker combination of the basis functions for the azimuth and elevation dimensions. For example, the basis functions in one dimension (i.e., azimuth or elevation) can be chosen from a sampling of the DFT (discrete Fourier transform) matrix V whose $(n,m)^{th}$ element is given by:

$$V_{nm}(M) = \exp\left\{-j\frac{2\pi}{M}(n-1)(m-1)\right\} \quad \text{(Eqn. 1)}$$

where $1 \le n \le M$ and $1 \le m \le M$. Referring again to FIG. 2 (with Q in the figure equal to $M^2$), the transmit or receive beam weights ($v_1$ through $V_Q$) for one of the basis function beams would then be the Kronecker product of two of the columns of V (one column for elevation and one column for azimuth). In equation form let $z_n$ refer to column n of V:

$$z_n = \begin{bmatrix} V_{1n} \\ \vdots \\ V_{Mn} \end{bmatrix} \quad \text{(Eqn. 2)}$$

then the set of $M^2$ basis functions or transmit weight vectors (where each weight vector is $M^2 \times 1$) may be defined by ($1 \le n \le M$ and $1 \le m \le M$):

$$v_{n+M(m-1)} = \begin{bmatrix} V_{1m}z_n \\ V_{2m}z_n \\ \vdots \\ V_{Mm}z_n \end{bmatrix} \quad \text{(Eqn. 3)}$$

Eqn. 3 describes an example of a Kronecker product of two of the columns of V. Note that these basis function beams can be referred to as having a DFT (discrete Fourier transform) matrix structure since they are generated from the columns of V. More particularly, since these basis function beams are the Kronecker product of columns of V, they can be referred to as having a 2D DFT matrix structure. Also these basis function beams can be thought of as Q×1 transmit beams derived from a discrete Fourier transform (DFT) matrix. If all M columns of V are used as described above then the basis functions created will be orthogonal. However, not all columns may be used in some embodiments. For example, the range of elevation or azimuth angles that an array needs to operate over may be limited. In this case, not all M columns of V may be used to create the basis functions in one or both of the dimensions (azimuth or elevation).

According to an example implementation, a Tx (transmit) beam may include a set of weights, which may be contained in a weight vector, where a different weight from the set (weight vector) is applied to a same signal to be sent from one or more antennas in an array of antennas in order to transmit the signal via a beam. In other words, the weights (or beam weights) are applied to a signal sent from the antenna(s) in the array to radiate the signal with the transmit beam corresponding to the weight vector. A Rx beam may include a set of weights, which may be contained in a weight vector, which will be applied to signals received on antenna(s) in an array of antennas to receive a signal via a beam(s) or via a set of basis function beams. One of these weight vectors in the set of beam weights is given by $V_1$ through $V_Q$ of FIG. 2. Referring to the basis function beam number n+M(m−1) given in Eqn. 3, in order to either transmit or receive using the given basis function beam, $V_1$ would be the first element of $v_{n+m(m-1)}$, $V_2$ would be the second element of $v_{n+m(m-1)}$, and so on.

Figure 5:
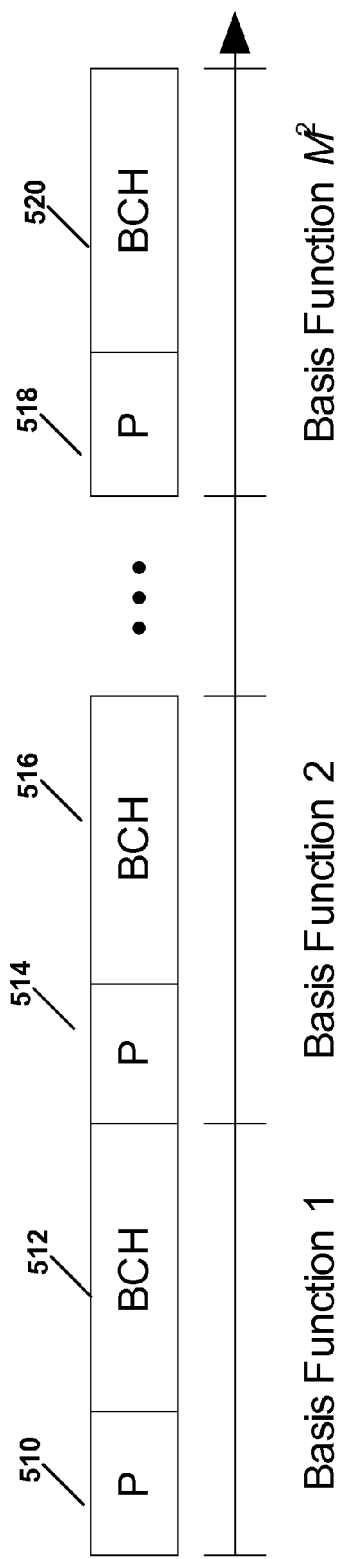
FIG. 5 is a diagram illustrating a transmission of pilot signals (P) and a broadcast control message (BCH) via a plurality of basis functions according to an example implementation.

For each Tx weight vector in the set of $M^2$ basis functions, the transmitter (BS) may transmit/send the broadcast control message and some pilot signals (or other sounding signals) over the resulting basis function beam as shown in FIG. 5. FIG. 5 is a diagram illustrating a transmission of pilot signals (P) and a broadcast control message (BCH) via a plurality of basis functions according to an example implementation. In this illustrative example, $M^2$ orthogonal basis functions may be used to transmit a copy of the sounding signals (P) and broadcast message (BCH), where M may be the number of transmit antennas/transmit antenna elements, according to an example implementation. For example, as shown in FIG. 5, the pilot sequence (P) 510 and broadcast control message (BCH) 512 are transmitted via basis function 1, pilot sequence (P) 514 and broadcast control message (BCH) 516 are transmitted via basis function 2, . . . and pilot sequence (P) 518 and broadcast control message (BCH) 520 are transmitted via basis function $M^2$. The pilot sequences (P) may be the same, and the broadcast control messages (BCH) may be the same message. Therefore, in this manner, a copy of a broadcast information (e.g., including pilot sequence/sounding signals and a broadcast control message) may be transmitted via each of a plurality of orthogonal basis functions, according to an example implementation. Note that FIG. 5 shows the pilots being sent before the BCH, but this ordering is only meant as an example and any ordering or mixing of the pilots and BCH is possible.

Assuming the receiver (MS) already chose its best Rx beam (i.e., receive combining weights), the receiver may then determine the best $M_B$ basis functions (or best $M_B$ broadcast control messages, sent via different basis functions) to combine together for achieving an optimal beamforming gain. For each of the selected $M_B$ Tx basis functions/basis function beams, the receiver would determine a gain and phase value from the pilot signal which accompanies the broadcast control message sent on that Tx beam. The gain and phase value can be found by correlating the received training corresponding with each basis function beam with the known pilot sequence and then selecting the gain and phase as the value at the strongest correlation value. In addition, the gain and phase may already be known at the Rx/MS and the MS may then combine the broadcast control message sent from the $M_B$ best Tx beams to obtain a broadcast control message to be decoded.

According to another example implementation, some further example details will now be provided. For example, p(n) for $0 \leq n \leq N_P-1$ may be the pilot symbols (i.e., the P in FIG. 5) and that x(n) $0 \leq n \leq N_C-1$ are symbols containing the broadcast control message/BCH information (i.e., the BCH portion in FIG. 5). Let the basis function beam t be given as $v_t$ (e.g., as defined above in Eqn. 3) which contains $M^2$ entries as follows:

$$V_t = \begin{bmatrix} v_{t,1} \\ v_{t,2} \\ \vdots \\ v_{t,M^2} \end{bmatrix}.$$ (Eqn. 4)

Each element (entry) of $v_t$ (Eqn. 4) contains a gain and phase value applied to the transmit antenna specified by the row index (e.g., $v_{t,m}$ is $V_m$ from FIG. 2). The BS would transmit the pilot sequences, p(n), and broadcast control message/BCH, x(n), multiple times where at each time block (consisting of $N_P+N_C$ symbols, i.e., both the pilot sequence (P) and broadcast control message (BCH) portion of FIG. 5) both would be transmitted with a given basis function beam. For example at a first time interval (or time block) the BS would transmit the pilot sequence (P) and broadcast control message (BCH) using basis function beam 1, $v_1$. In equation form the BS would transmit the following from its $m^{th}$ transmit antenna during the first time block (note all $Q=M^2$ antennas would transmit this information at the same time):

$v_{1,m}p(n)$ for the first $N_P$ time samples in the first time block and $v_{1,m}x(n)$ from the subsequent $N_C$ symbols in the first time block.

For the second time block, the BS would transmit the following from its $m^{th}$ transmit antenna during the second time block:

$v_{2,m}p(n)$ for the first $N_P$ time samples in the second time block and $v_{2,m}x(n)$ from the subsequent $N_C$ symbols in the second time block.

A similar process is followed for all $M^2$ basis functions where for the $t^{th}$ time block the BS would transmit the following from its $m^{th}$ transmit antenna:

$v_{t,m}p(n)$ for the first $N_P$ time samples in the $t^{th}$ time block and $v_{t,m}x(n)$ from the subsequent $N_C$ symbols in the $t^{th}$ time block. The transmissions will go through a channel described by the $M^2 \times 1$ vector h whose $m^{th}$ entry, $h_m$, describes the channel (i.e., is the gain and phase value) from the $m^{th}$ transmit antenna to the mobile (where for simplicity of this explanation a single receive antenna is assumed at the MS and a frequency-flat channel is assumed). The MS will receive the following for time block t (i.e., the block where the BS is using basis function beam t to transmit the pilot sequence and broadcast control message):

$$y_{P,t}(n) = p(n) \sum_{m=1}^{M^2} v_{t,m} h_m = (v_t^T h) p(n)$$

for the first $N_P$ time samples in the $t^{th}$ time block (i.e., the P portion of FIG. 5) and $$y_{BCH,t}(n) = x(n) \sum_{m=1}^{M^2} v_{t,m} h_m = (v_t^T h) x(n)$$

from the subsequent $N_C$ symbols in the $t^{th}$ time block (i.e., the BCH portion of FIG. 5).

The MS can use the pilot sequences to determine an estimate of $(v_t^T h)$ for each time block (i.e., for each transmission where the base station transmits using a different basis function beam). The gain and phase weighting, $\alpha_t$, that the MS will use to weight the received broadcast control message/BCH on time block t will thus be the conjugate of this quantity, i.e., $\alpha_t = (v_t^T h)^*$. The MS would next choose the $M_B$ (e.g., $M_B=3$) strongest of these gain and phase values and, for example, the indices of these $M_B$ strongest basis functions may be $t_1$ through $t_{M_B}$. Then the MS would create a combined broadcast control message (combined BCH) to decode and use for control by combining the $M_B$ strongest beams as follows:

$$\hat{x}(n) = \sum_{b=1}^{M_B} \alpha_{t_b} y_{BCH,t_b}(n).$$ (Eqn. 5)

It can be shown that through this combining, the MS would obtain a broadcast control message/BCH as if it were beamformed to that MS with the optimal RF beamformer. For example assume $M^2=16$, the 16 16×1 basis functions are $v_1$ through $v_{16}$, and that x(n) is the desired broadcast control message plus pilot signals. At time t (1≤t≤16) the BS transmits $v_t p(n)$ and $v_t x(n)$ from its RF array. The MS would receive/listen to each of the transmissions and would determine a gain and phase value, $\alpha_t$, for all or just the $M_B$ dominant (e.g., strongest) basis functions from the received pilot transmissions, $v_t p(n)$ for 1≤t≤16. The gain and phase value can be found by correlating the received training at each time t with the known pilot sequence and then selecting the gain and phase as the value at the strongest correlation value. Then the MS would combine those transmissions using estimated gain and phase value to obtain a combined broadcast control signal (combined BCH) which is as strong as if the optimal beamformer was used. Assuming the $M^2 \times 1$ channel vector is h, the received noise at time t is given by $n_t(n)$ with power is $\sigma^2$ and the sum of the powers of gain and phase values are one, then the combined broadcast control message estimate would be given by:

$$\hat{x}(n) = \sum_{t=1}^{16} \alpha_t [v_t^T h x(n) + n_t(n)] = \quad \text{(Eqn. 6)}$$

$$x(n)\sum_{t=1}^{16} \alpha_t v_t^T h + \sum_{t=1}^{16} \alpha_t n_t(n) = x(n)\sum_{t=1}^{16} \alpha_t v_t^T h + n'(n).$$

where n'(n) will have power of $\sigma^2$ which is identical to the noise power for one time instance.

As long as there were no errors in the estimation of the gain and phase values and the sum of the powers of the gain and phase values is one, the optimal beamformer to the user would be given as:

$$v_{OPT} = \sum_{t=1}^{16} \alpha_t v_t \quad \text{(Eqn. 7)}$$

Hence the optimal RF beamforming gain would be achieved by combining the broadcast control transmissions in this fashion:

$$\hat{x}(n) = v_{OPT}^T h x(n) + n'(n) \quad \text{(Eqn. 8)},$$

which is identical if the broadcast control was sent to the user on a single time period using the best RF beam to that user. Note that not all 16 transmissions would need to be combined in general since only some number of beams are dominant (e.g., $M_B$ dominant beams) and hence the optimal beam can be approximated by:

$$v_{OPT} \approx \sum_{t'=1}^{M_B} \alpha_{t'} v_{t'} \quad \text{(Eqn. 9)}$$

where the indices of these $M_B$ strongest basis functions may be $t_1$ through $t_{M_B}$.

Additionally, the gain and phase values for the dominant $M_B$ beams could be fed (or sent) back from the MS to the BS so that the BS could determine the optimal RF beamformer to use with that MS, e.g., for future transmissions from the BS to the MS. This feedback (e.g., an identification of the dominant $M_B$ basis function beams and the determined gain and phase value for each beam) may be sent via (or combined with) a random access channel (RACH) message (or RACH request) sent to the BS.

Figure 6:
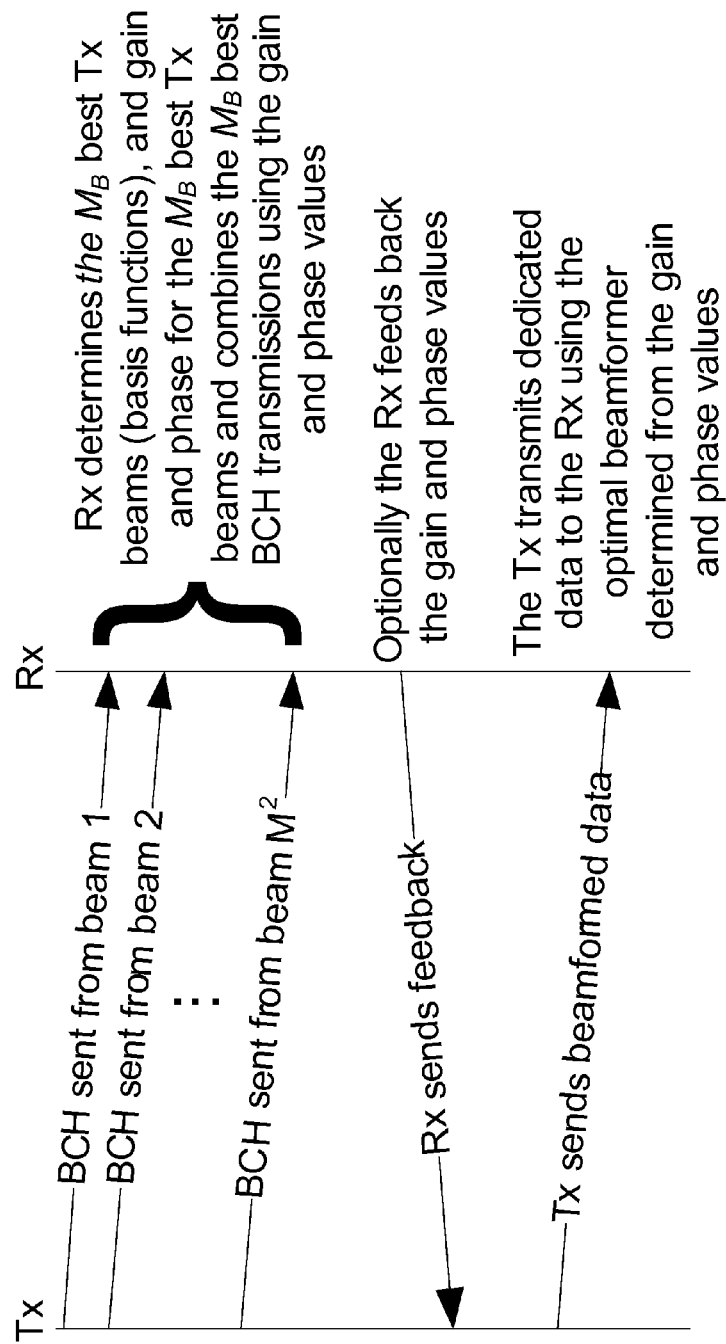
FIG. 6 is as diagram illustrating operation of a wireless network according to an example implementation.

FIG. 6 is as diagram illustrating operation of a wireless network according to an example implementation. As shown in FIG. 6, a transmitter (Tx or BS) may transmit multiple copies of broadcast information, e.g., which may include pilot sequences and a broadcast control message (BCH) to a receiver (Rx or MS). The broadcast information may be sent via each of a plurality orthogonal basis function beams, e.g., via beam 1, beam 2, . . . beam $M^2$, as shown in FIG. 6. The receiver (Rx or MS) may determine the $M_B$ best Tx basis function beams and a gain and phase value for each of the $M_B$ best Tx basis function beams. The receiver (or MS) may then combine the broadcast control messages (BCH) received via each of the $M_B$ best Tx basis function beams in a weighted sum, with each broadcast control message (BCH) being weighted by its gain and phase value, and then summed or added together to obtain a combined broadcast control message.

Also, as shown in FIG. 6, the receiver/MS may also send/feed back to the BS an identification of the $M_B$ best Tx basis function beams and the gain and phase value for each of these beams. The transmitter/BS may then determine an optimal beamformer (e.g., a set of beamforming weights for the MS based on the best basis function beams and the gain and phase values for each received by the BS from the MS). The transmitter/BS may then transmit beamformed data (data directed to the MS) using the optimal beamformer determined by the BS based on the gain and phase values for the $M_B$ best Tx basis function beams.

Figure 7:
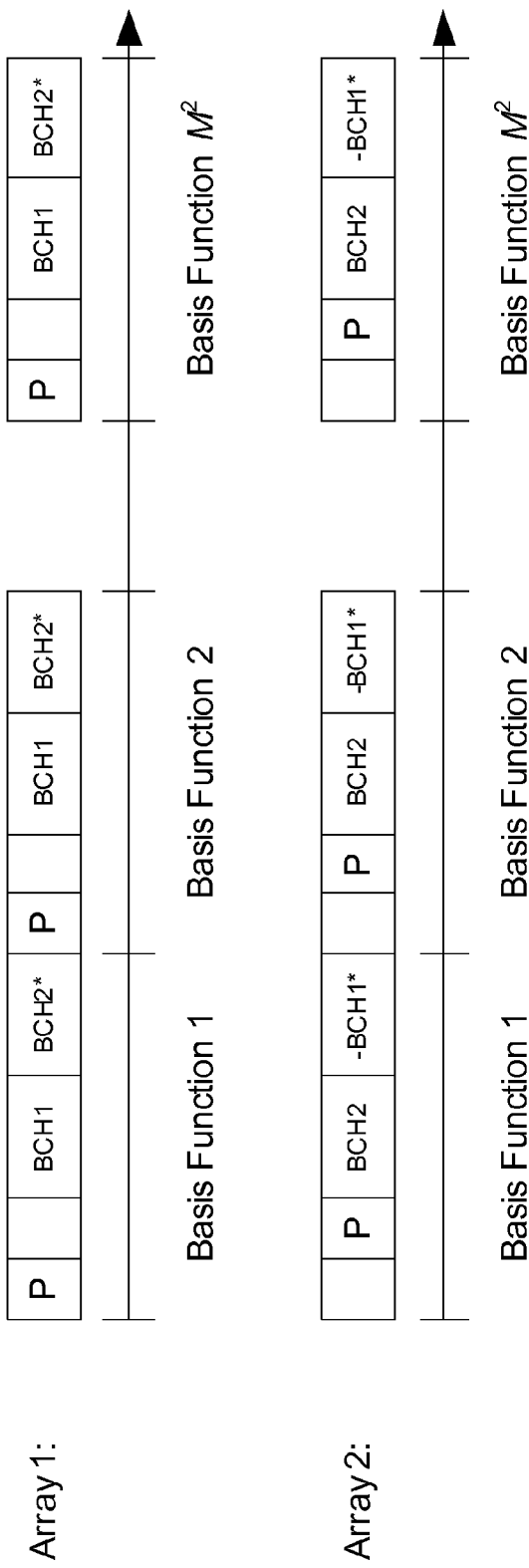
FIG. 7 is a diagram illustrating basis function transmission of broadcast information when using space-time coding across arrays with orthogonal polarizations according to an example implementation.

FIG. 7 is a diagram illustrating basis function transmission of broadcast information when using space-time coding across arrays with orthogonal polarizations according to an example implementation. In order to handle two arrays per sector each with orthogonal polarizations, space time-coding may be used across the two arrays. This option is shown in FIG. 7 where the pilot sequence (P) and broadcast control message (BCH) portions of FIG. 5 are divided or segmented into two portions to accommodate the space-time coding. For the pilot sequence (P), one array sends pilots in the first half of the pilot sequence (e.g., the first 256 symbols of a 512 symbol pilot sequence) and the second array sends pilots in the second half of the pilot sequence (e.g., the second 256 symbols of a 512 symbol pilot section). Alternatively, the pilots could be sent at the same times but with different codes (e.g., orthogonal codes) or orthogonally in frequency. The BCH block is also divided or segmented into two equal halves, BCH1 (e.g., of length 512 symbols if the BCH is 1024 symbols) and BCH2. In the first half of the BCH portion, array 1 sends BCH1 and in the second half, array 1 sends BCH2* which means the conjugate-time reversal of BCH2 (e.g., if $x_2(n)$ are the symbols in BCH2 for 0≤n≤511 then BCH2* has symbols $x_2*((512-n)_{512})$ where $(n)_M$ means n mod M). In the first half of the BCH portion the other array, array 2, sends BCH2 and in the second half, array 2 sends −BCH1* which means the negative of the conjugate time-reversal of BCH1. The receiver (Rx or MS) would receive the sum of the two signals transmitted from the arrays. The Rx/MS would then determine the dominant $M_B$ basis functions for both Tx arrays (jointly) along with a gain and phase for combining the signals across the different BCH transmissions. Then standard frequency-domain space-time decoding can be used on the resulting signal to decode the BCH. In this approach it is assumed that each array uses the same basis functions at the same time and that similar beam patterns are produced from the arrays when transmitting using the same basis functions. Similar space-time coding procedures can be followed for more than two sets of antennas for space-time coding procedures designed for more than two antennas. In this way the broadcast information would be space-time coded across two or more sets of antennas.

Some other example implementations may include one or more different or additional features. Another option to handle the case of two cross-polarized arrays in a single sector is to create a basis function which spans the $2M^2$ antennas (e.g., all 32 antennas in each sector). The basis functions in this case could simply be the Kronecker product of the basis function for a single array (e.g., as given above for DFT vectors) with $$\sqrt{0.5}\begin{bmatrix} 1 & 1 \\ 1 & -1 \end{bmatrix}.$$

This option would require twice the number of basis functions relative to using space-time coding as described above but would not require that each array produces a similar beam pattern when transmitting using the same basis functions. In an example implementation, the total number of basis functions can be less than $M^2$ if some scanning angles of the basis functions are out of the sector coverage (e.g., greater than some angle in azimuth or elevation).

Another challenge may be how the BS may communicate to the MS the total number of basis functions being used by the system. It is assumed that the MS knows the system timing and the time points at which the basis function transmission processes will begin. If the MS does not know ahead of time the total number of basis functions, the system/network could be designed/specified to have some maximum allowed number of basis functions, and the MS could start by assuming that the maximum number is being used. In this case, the broadcast control message could contain the actual number of basis functions that the system is using. Then, to learn the actual number, the MS could act as follows: As the MS receives several successive basis function transmissions, the MS could at some point in the process start combining what it has received so far and attempt to decode the broadcast control message. At some point, the MS will be able to decode the broadcast control message (e.g., based on combining two or more of the received broadcast control messages) and learn the actual number of basis functions being used. The MS would then know when the time interval for the basis function transmissions will end.

According to another example implementation, the MS may first try to decode the control channel message only using the strongest basis function (beam). If it fails to decode the broadcast control message using only the BCH sent with the strongest basis function, then the MS would use the basis function combining of the repeated control messages to improve detection.

Simulation results are now described comparing the basis function technique (transmission of the BCH via multiple orthogonal basis function beams) with a method which repeats the BCH on a grid of beams and the receiver decodes the BCH received on the strongest beam. A null cyclic prefix single carrier (NCP-SC) communication system is assumed with 1024 symbols in a block and a null cyclic prefix length of 64 samples. A 72 GHz carrier frequency is assumed with a 2.0 GHz bandwidth and a root-raised cosine pulse with rolloff factor of 0.25 is employed. In each case 150 NCP-SC blocks are available for repeating the BCH and the BCH contains 150 bits. The Tx/BS has two 8×8 arrays in each sector where one array is vertically polarized and the other is horizontally polarized. The Rx/MS has a single 2×2 array with vertical polarization but the Rx orientation is randomized for each Monte-Carlo run. For the grid of beams there are 64 beams used (the control is repeated on each beam) where there are 256 pilots for each array and the BCH is 1024 BPSK symbols including the cyclic prefix with rate 5/32 turbo-coding. For the basis function 64 beams (bases) are used. For both the grid of beams and the basis functions, space-time coding of the BCH is used as described above. The simulated channel is a line-of-sight mmWave urban-micro channel.

Figure 8:
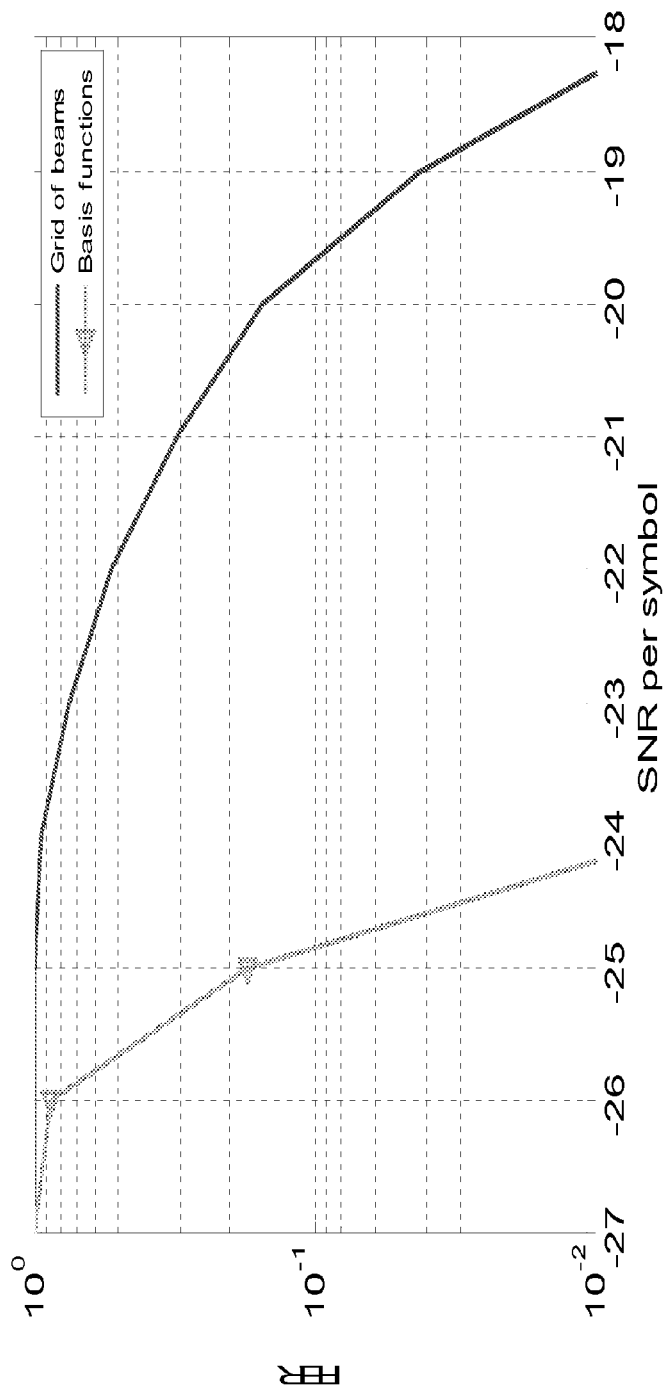
FIG. 8 is a diagram illustrating frame error rate (FER) plotted versus signal-to-noise ratio (SNR) for both the basis function technique and the grid of beams.

FIG. 8 is a diagram illustrating frame error rate (FER) plotted versus signal to noise ratio (SNR) for both the basis function technique and the grid of beams. The basis function technique (e.g., in which the BCH is transmitted via the orthogonal set of basis function beams, and the MS determines a combined BCH based on a group of best basis function beams) is able to obtain the full beamforming gain and hence has over a 5 dB advantage over just picking the best beam from the grid of beams.

The basis function method may be able to obtain the full RF beam steering gain while providing omni-directional coverage with the broadcast control channel. This gain may be obtained by the BS only scanning orthogonal beams whose number is no more than the total number of antennas in the array. Also the method is extended to pairs of arrays operating in a single sector where the arrays have orthogonal polarizations relative to each other.

The various example implementations may include a number of advantages, by way of illustrative example:
1. Obtaining the full RF beamforming gain while operating in a broadcast mode.
2. Requires minimal (or fewer) repetition of transmission the broadcast control message since the BCH only needs to be repeated on an orthogonal basis instead of very fine grid of beams. For example with an M×M array, the fine grid of beams needs repetition across $4M^2$ beams to get within about 1.0 dB of the best RF beamforming weight whereas the basis functions only needs repetition over $M^2$ beams to obtain the gain seen by the best RF beamforming weight.
3. The method extends to multiple arrays per sector (possibly with each array having orthogonal polarizations) through either space-time coding or by extending the basis functions to include polarization.

An example is now given showing the differences between a grid of beams approach and the basis function beam approach. Take for example a 4-element uniform linear array with a half wavelength spacing between elements. In this case there would be four basis function vectors, where row n of vector m is given as:

$$V_{nm}(4) = \exp\left\{-j\frac{2\pi}{4}(n-1)(m-1)\right\}, \qquad \text{(Eqn. 10)}$$

where $1 \leq n \leq 4$ and $1 \leq m \leq 4$.

If the MS only decodes a signal sent on the best basis function beam, it would only get a beamforming gain (received power) of 4.5 dB which is 1.5 dB less than maximum gain of 6.0 dB. If the MS was located at −14.5 degrees in azimuth and if the MS only decodes a signal sent on the best basis function beam, then it would only get a beamforming gain of 2.3 dB which is 3.7 dB less than the maximum gain of 6.0 dB. However, by combining the four received signals, the MS can still get the maximum gain of 6.0 dB with the BS only sending the control information from four basis function beams, for example.

According to an example implementation, an apparatus may include means (902A/902B, 904, FIG. 9) for transmitting, by a base station, multiple copies of a broadcast information including a broadcast control message, wherein a copy of the broadcast information is transmitted via each of a plurality of basis function beams;

According to an example implementation, the apparatus may further include means (902A/902B, 904, FIG. 9) for receiving, by the base station from a mobile station in response to the transmitting, feedback signals indicating a gain and phase value for each of a plurality of dominant basis function beams of the plurality of basis function beams, and means (902A/902B, 904, FIG. 9) for determining, based on the feedback signals, a set of beamforming weights optimized for the mobile station.

According to an example implementation, the means for transmitting may include: means (902A/902B, 904, FIG. 9) for transmitting by a base station a broadcast information including a set of sounding signals and a broadcast control message via each of a plurality of orthogonal basis function beams.

According to an example implementation, the base station includes two sets of antennas, wherein the means for transmitting may include: means (902A/902B, 904, FIG. 9) for transmitting, by the base station, a broadcast information that is space-time coded across the two sets of antennas.

According to an example implementation, the apparatus may further include means (902A/902B, 904, FIG. 9) for transmitting, by the base station to the mobile station, beamformed data based on the set of beamforming weights.

According to an example implementation, the means for receiving may include: means (902A/902B, 904, FIG. 9) for receiving, by the base station from a first mobile station in response to the transmitting, feedback signals specific to the first mobile station that include a gain and phase value for each of a plurality of dominant basis function beams that are dominant for the first mobile station; and means (902A/902B, 904, FIG. 9) for receiving, by the base station from a second mobile station in response to the transmitting, feedback signals specific to the second mobile station that include a gain and phase value for each of a plurality of dominant basis function beams that are dominant for the second mobile station.

According to an example implementation, the means for determining may include: means (902A/902B, 904, FIG. 9) for determining, based on the feedback signals specific to the first mobile station, a first set of beamforming weights optimized for the first mobile station; and means (902A/902B, 904, FIG. 9) for determining, based on the feedback signals specific to the second mobile station, a second set of beamforming weights optimized for the second mobile station.

According to an example implementation, the means for transmitting may include: means (902A/902B, 904, FIG. 9) for transmitting a broadcast information that includes a set of sounding signals and a broadcast control message via a set of orthogonal basis function beams, the base station applying an individual gain and phase weighting to each of Q antennas to transmit a copy of the broadcast information via each beam of the set of orthogonal basis function beams.

According to an example implementation, the plurality of basis function beams are derived from a discrete Fourier transform (DFT) matrix.

According to another example implementation, an apparatus may include at least one processor and at least one memory including computer instructions, when executed by the at least one processor, cause the apparatus to: transmit, by a base station, multiple copies of a broadcast information including a broadcast control message, wherein a copy of the broadcast information is transmitted via each of a plurality of basis function beams.

According to an example implementation of the apparatus, the apparatus may be further caused to receive, by the base station from a mobile station in response to the transmitting, feedback signals indicating a gain and phase value for each of a plurality of dominant basis function beams of the plurality of basis function beams, and determine, based on the feedback signals, a set of beamforming weights optimized for the mobile station.

According to an example implementation of the apparatus, causing the apparatus to transmit may include causing the apparatus to: transmit by a base station a broadcast information including a set of sounding signals and a broadcast control message via each of a plurality of orthogonal basis function beams.

According to an example implementation of the apparatus, the base station includes two sets of antennas, wherein causing the apparatus to transmit may include causing the apparatus to: transmit, by the base station, a broadcast information that is space-time coded across the two sets of antennas.

According to an example implementation of the apparatus, the apparatus may be further caused to transmit, by the base station to the mobile station, beamformed data based on the set of beamforming weights.

According to an example implementation of the apparatus, causing the apparatus to receive may include causing the apparatus to: receive, by the base station from a first mobile station in response to the transmitting, feedback signals specific to the first mobile station that include a gain and phase value for each of a plurality of dominant basis function beams that are dominant for the first mobile station; and receive, by the base station from a second mobile station in response to the transmitting, feedback signals specific to the second mobile station that include a gain and phase value for each of a plurality of dominant basis function beams that are dominant for the second mobile station.

According to an example implementation of the apparatus, causing the apparatus to determine may include causing the apparatus to: determine, based on the feedback signals specific to the first mobile station, a first set of beamforming weights optimized for the first mobile station; and determine, based on the feedback signals specific to the second mobile station, a second set of beamforming weights optimized for the second mobile station.

According to another example implementation, an apparatus may include means (902A/902B, 904, FIG. 9) for receiving, by a mobile station from a base station, a plurality of copies of a broadcast information including a broadcast control message, wherein a copy of the broadcast information is transmitted via each of a plurality of basis function beams; means (902A/902B, 904, FIG. 9) for determining, by the mobile station, a gain and phase value for each copy of at least a subset of the plurality of the received copies of the broadcast control message transmitted via different basis function beams; and means (902A/902B, 904, FIG. 9) for determining, by the mobile station, a combined broadcast control message based on at least the subset of the plurality of the received copies of the broadcast control message and the gain and phase value for each copy of at least the subset of the plurality of the received copies of the broadcast control message.

According to an example implementation, the apparatus may further include means (902A/902B, 904, FIG. 9) for decoding, by the mobile station, the combined broadcast control message.

According to an example implementation, each copy of the broadcast control message may be transmitted via a different basis function beam of a set of orthogonal basis function beams.

According to an example implementation, the means for determining a gain and phase value for each copy of at least a subset of the plurality of the received copies of the broadcast control message may include: means (902A/902B, 904, FIG. 9) for determining, based on an amplitude of at least a portion of each received copy of the broadcast information, a dominant subset of the plurality of the received copies of the broadcast control message; and means (902A/902B, 904, FIG. 9) for determining a gain and phase value for each copy of the dominant subset of the plurality of the received copies of the broadcast control message.

According to an example implementation, the means for determining a combined broadcast control message may include: means (902A/902B, 904, FIG. 9) for determining a combined broadcast control message as a sum of the subset of the plurality of the weighted received copies of the broadcast control message, where each received copy is weighted by its gain and phase value.

According to an example implementation, the apparatus may further include means (902A/902B, 904, FIG. 9) for sending, from the mobile station to the base station, a feedback signal identifying a plurality of best or dominant basis functions and a gain and phase value for each of the plurality of dominant basis functions.

According to an example implementation, the means for receiving may include means (902A/902B, 904, FIG. 9) for receiving, by a mobile station from a base station, a plurality of copies of a broadcast information, each copy of the broadcast information including a set of sounding signals and a broadcast control message transmitted via a different basis function beam of a set of orthogonal basis function beams; and wherein the means for determining a gain and phase value may include means (902A/902B, 904, FIG. 9) for determining a gain and phase value for at least a subset of the basis function beams based on the copy of the sounding signals received via each of a plurality of the basis function beams.

According to an example implementation, the apparatus may further include means (902A/902B, 904, FIG. 9) for determining, by the mobile station, a best or most dominant copy of the broadcast control message; means (902A/902B, 904, FIG. 9) for determining, by the mobile station, that the mobile station cannot decode the best copy of the broadcast control message; and the mobile station including means (902A/902B, 904, FIG. 9) for performing the following in response to determining that the mobile station cannot decode the best copy of the broadcast control message: determining the combined broadcast control message based on at least the subset of the plurality of the received copies of the broadcast control message and the gain and phase value for each copy of at least the subset of the plurality of the received copies of the broadcast control message; and decoding the combined broadcast control message.

According to another example implementation, an apparatus may include at least one processor and at least one memory including computer instructions, when executed by the at least one processor, cause the apparatus to: receive, by a mobile station from a base station, a plurality of copies of a broadcast information including a broadcast control message, wherein a copy of the broadcast information is transmitted via each of a plurality of basis function beams; determine, by the mobile station, a gain and phase value for each copy of at least a subset of the plurality of the received copies of the broadcast control message transmitted via different basis function beams; and determine, by the mobile station, a combined broadcast control message based on at least the subset of the plurality of the received copies of the broadcast control message and the gain and phase value for each copy of at least the subset of the plurality of the received copies of the broadcast control message.

According to an example implementation, the apparatus may be further caused to decode, by the mobile station, the combined broadcast control message.

According to another example implementation, each copy of the broadcast control message is transmitted via a different basis function beam of a set of orthogonal basis function beams.

According to an example implementation, causing the apparatus to determine a gain and phase value for each copy of at least a subset of the plurality of the received copies of the broadcast control message may include causing the apparatus to: determine, based on an amplitude of at least a portion of each received copy of the broadcast information, a dominant subset of the plurality of the received copies of the broadcast control message; and determine a gain and phase value for each copy of the dominant subset of the plurality of the received copies of the broadcast control message.

According to an example implementation, the causing the apparatus to determine a combined broadcast control message may include causing the apparatus to: determine a combined broadcast control message as a sum of the subset of the plurality of the weighted received copies of the broadcast control message, where each received copy is weighted by its gain and phase value.

According to an example implementation, the apparatus may be further caused to send, from the mobile station to the base station, a feedback signal identifying a plurality of best or dominant basis functions and a gain and phase value for each of the plurality of dominant basis functions.

According to an example implementation, causing the apparatus to receive may include causing the apparatus to: receive, by a mobile station from a base station, a plurality of copies of a broadcast information, each copy of the broadcast information including a set of sounding signals and a broadcast control message transmitted via a different basis function beam of a set of orthogonal basis function beams; and wherein causing the apparatus to determine a gain and phase value comprises may include the apparatus to determine a gain and phase value for at least a subset of the basis function beams based on the copy of the sounding signals received via each of a plurality of the basis function beams.

According to an example implementation, the apparatus may be further caused to determine, by the mobile station, a best or most dominant copy of the broadcast control message; determine, by the mobile station, that the mobile station cannot decode the best copy of the broadcast control message; and the mobile station being caused to perform the following in response to determining that the mobile station cannot decode the best copy of the broadcast control message: determine the combined broadcast control message based on at least the subset of the plurality of the received copies of the broadcast control message and the gain and phase value for each copy of at least the subset of the plurality of the received copies of the broadcast control message; and decode the combined broadcast control message.

According to an example implementation, a computer program product may include a computer-readable storage medium and storing executable code that, when executed by at least one data processing apparatus, is configured to cause the at least one data processing apparatus to perform a method including: receiving, by a mobile station from a base station, a plurality of copies of a broadcast information including a broadcast control message, wherein a copy of the broadcast information is transmitted via each of a plurality of basis function beams; determining, by the mobile station, a gain and phase value for each copy of at least a subset of the plurality of the received copies of the broadcast control message transmitted via different basis function beams; and determining, by the mobile station, a combined broadcast control message based on at least the subset of the plurality of the received copies of the broadcast control message and the gain and phase value for each copy of at least the subset of the plurality of the received copies of the broadcast control message.

Figure 9:
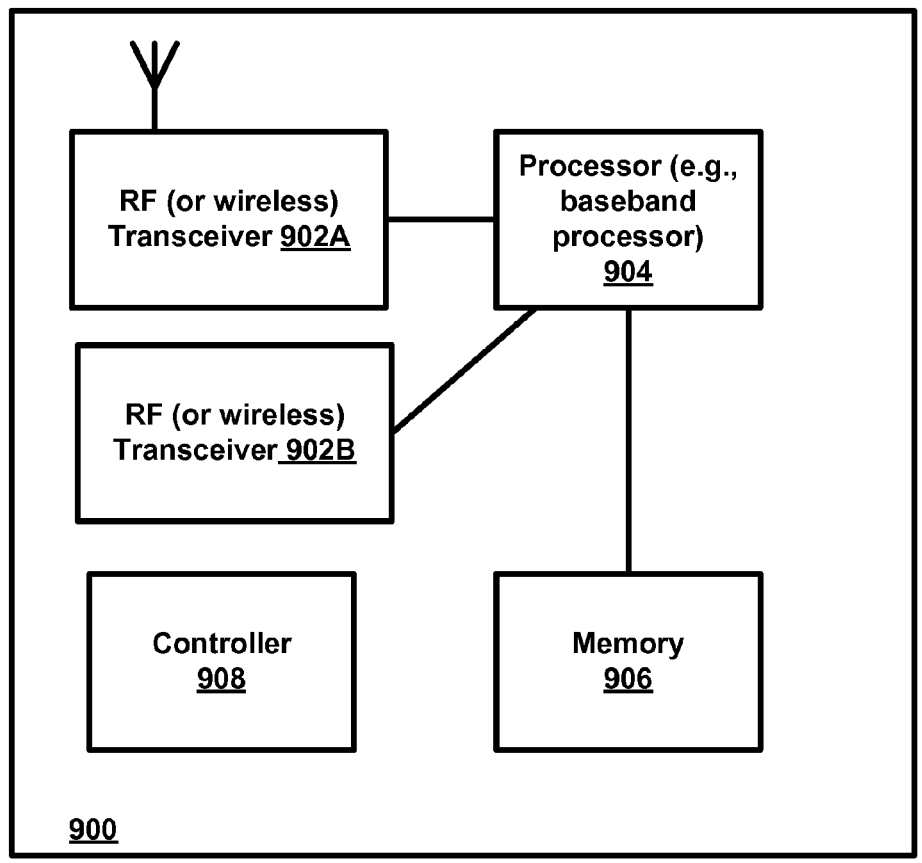
FIG. 9 is a block diagram of a wireless station (e.g., base station or mobile station) according to an example implementation.

FIG. 9 is a block diagram of a wireless station (e.g., BS or user device) 900 according to an example implementation. The wireless station 900 may include, for example, two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting, by a base station, multiple copies of a broadcast information including a broadcast control message, wherein a copy of the broadcast information is transmitted via each of a plurality of basis function beams.

2. The method of claim 1 and further comprising:
receiving, by the base station from a mobile station in response to the transmitting, feedback signals indicating a gain and phase value for each of a plurality of dominant basis function beams of the plurality of basis function beams; and
determining, based on the feedback signals, a set of beamforming weights optimized for the mobile station.

3. The method of claim 1 wherein the transmitting comprises:
transmitting by a base station a broadcast information including a set of sounding signals and a broadcast control message via each of a plurality of orthogonal basis function beams.

4. The method of claim 2, wherein the base station includes two or more sets of antennas, wherein the transmitting comprises:
transmitting, by the base station, a broadcast information that is space-time coded across the two or more sets of antennas.

5. The method of claim 2 and further comprising:
transmitting, by the base station to the mobile station, beamformed data based on the set of beamforming weights.

6. The method of claim 2 wherein the receiving comprises:
receiving, by the base station from a first mobile station in response to the transmitting, feedback signals specific to the first mobile station that include a gain and phase value for each of a plurality of dominant basis function beams that are dominant for the first mobile station; and receiving, by the base station from a second mobile station in response to the transmitting, feedback signals specific to the second mobile station that include a gain and phase value for each of a plurality of dominant basis function beams that are dominant for the second mobile station.

7. The method of claim 6 and further comprising:
determining, based on the feedback signals specific to the first mobile station, a first set of beamforming weights optimized for the first mobile station; and
determining, based on the feedback signals specific to the second mobile station, a second set of beamforming weights optimized for the second mobile station.

8. The method of claim 1 wherein the transmitting comprises:
transmitting a broadcast information that includes a set of sounding signals and a broadcast control message via a set of orthogonal basis function beams, the base station applying an individual gain and phase weighting to each of Q antennas to transmit a copy of the broadcast information via each beam of the set of orthogonal basis function beams.

9. The method of claim 1 wherein the plurality of basis function beams are derived from a discrete Fourier transform (DFT) matrix.

10. An apparatus comprising at least one processor and at least one memory including computer instructions, when executed by the at least one processor, cause the apparatus to:
transmit, by a base station, multiple copies of a broadcast information including a broadcast control message, wherein a copy of the broadcast information is transmitted via each of a plurality of basis function beams.

11. The apparatus of claim 10 wherein the apparatus is further caused to:
receive, by the base station from a mobile station in response to the transmitting, feedback signals indicating a gain and phase value for each of a plurality of dominant basis function beams of the plurality of basis function beams; and
determine, based on the feedback signals, a set of beamforming weights optimized for the mobile station.

12. The apparatus of claim 10 wherein causing the apparatus to transmit comprises causing the apparatus to:
transmit by a base station a broadcast information including a set of sounding signals and a broadcast control message via each of a plurality of orthogonal basis function beams.

13. The apparatus of claim 10 wherein the base station includes two or more sets of antennas, wherein causing the apparatus to transmit comprises causing the apparatus to:
transmit, by the base station, a broadcast information that is space-time coded across the two sets of antennas.

14. The apparatus of claim 11 and further comprising causing the apparatus to:
transmit, by the base station to the mobile station, beamformed data based on the set of beamforming weights.

15. The apparatus of claim 11 wherein causing the apparatus to receive comprises causing the apparatus to:
receive, by the base station from a first mobile station in response to the transmitting, feedback signals specific to the first mobile station that include a gain and phase value for each of a plurality of dominant basis function beams that are dominant for the first mobile station; and
receive, by the base station from a second mobile station in response to the transmitting, feedback signals specific to the second mobile station that include a gain and phase value for each of a plurality of dominant basis function beams that are dominant for the second mobile station.

16. The apparatus of claim 15 and further causing the apparatus to:
determine, based on the feedback signals specific to the first mobile station, a first set of beamforming weights optimized for the first mobile station; and
determine, based on the feedback signals specific to the second mobile station, a second set of beamforming weights optimized for the second mobile station.

17. A method comprising:
receiving, by a mobile station from a base station, a plurality of copies of a broadcast information including a broadcast control message, wherein a copy of the broadcast information is transmitted via each of a plurality of basis function beams;
determining, by the mobile station, a gain and phase value for each copy of at least a subset of the plurality of the received copies of the broadcast control message transmitted via different basis function beams; and
determining, by the mobile station, a combined broadcast control message based on at least the subset of the plurality of the received copies of the broadcast control message and the gain and phase value for each copy of at least the subset of the plurality of the received copies of the broadcast control message.

18. The method of claim 17 and further comprising decoding, by the mobile station, the combined broadcast control message.

19. The method of claim 17 wherein each copy of the broadcast control message is transmitted via a different basis function beam of a set of orthogonal basis function beams.

20. The method of claim 17 wherein the determining a gain and phase value for each copy of at least a subset of the plurality of the received copies of the broadcast control message comprises:
determining, based on an amplitude of at least a portion of each received copy of the broadcast information, a dominant subset of the plurality of the received copies of the broadcast control message; and
determining a gain and phase value for each copy of the dominant subset of the plurality of the received copies of the broadcast control message.

21. The method of claim 17 wherein the determining a combined broadcast control message comprises:
determining a combined broadcast control message as a sum of the subset of the plurality of the weighted received copies of the broadcast control message, where each received copy is weighted by its gain and phase value.

22. The method of claim 17, the method further comprising:
sending, from the mobile station to the base station, a feedback signal identifying a plurality of best or dominant basis functions and a gain and phase value for each of the plurality of dominant basis functions.

23. The method of claim 17 wherein the receiving comprises:
receiving, by a mobile station from a base station, a plurality of copies of a broadcast information, each copy of the broadcast information including a set of sounding signals and a broadcast control message transmitted via a different basis function beam of a set of orthogonal basis function beams; and
wherein the determining a gain and phase value comprises determining a gain and phase value for at least a subset of the basis function beams based on the copy of the sounding signals received via each of a plurality of the basis function beams.

24. The method of claim 17 and further comprising:
determining, by the mobile station, a best or most dominant copy of the broadcast control message;
determining, by the mobile station, that the mobile station cannot decode the best copy of the broadcast control message; and
the mobile station performing the following in response to determining that the mobile station cannot decode the best copy of the broadcast control message:
   determining the combined broadcast control message based on at least the subset of the plurality of the received copies of the broadcast control message and the gain and phase value for each copy of at least the subset of the plurality of the received copies of the broadcast control message; and
   decoding the combined broadcast control message.

25. An apparatus comprising at least one processor and at least one memory including computer instructions, when executed by the at least one processor, cause the apparatus to:
receive, by a mobile station from a base station, a plurality of copies of a broadcast information including a broadcast control message, wherein a copy of the broadcast information is transmitted via each of a plurality of basis function beams;
determine, by the mobile station, a gain and phase value for each copy of at least a subset of the plurality of the received copies of the broadcast control message transmitted via different basis function beams; and
determine, by the mobile station, a combined broadcast control message based on at least the subset of the plurality of the received copies of the broadcast control message and the gain and phase value for each copy of at least the subset of the plurality of the received copies of the broadcast control message.

26. The apparatus of claim 25 and further comprising causing the apparatus to decode, by the mobile station, the combined broadcast control message.

27. The apparatus of claim 25 wherein each copy of the broadcast control message is transmitted via a different basis function beam of a set of orthogonal basis function beams.

28. The apparatus of claim 25 wherein causing the apparatus to determine a gain and phase value for each copy of at least a subset of the plurality of the received copies of the broadcast control message comprises causing the apparatus to:
determine, based on an amplitude of at least a portion of each received copy of the broadcast information, a dominant subset of the plurality of the received copies of the broadcast control message; and
determine a gain and phase value for each copy of the dominant subset of the plurality of the received copies of the broadcast control message.

29. The apparatus of claim 25 wherein causing the apparatus to determine a combined broadcast control message comprises causing the apparatus to:
determine a combined broadcast control message as a sum of the subset of the plurality of the weighted received copies of the broadcast control message, where each received copy is weighted by its gain and phase value.

30. The apparatus of claim 25, and further causing the apparatus to:
send, from the mobile station to the base station, a feedback signal identifying a plurality of best or dominant basis functions and a gain and phase value for each of the plurality of dominant basis functions.

31. The apparatus of claim 25 wherein causing the apparatus to receive comprises causing the apparatus to:
receive, by a mobile station from a base station, a plurality of copies of a broadcast information, each copy of the broadcast information including a set of sounding signals and a broadcast control message transmitted via a different basis function beam of a set of orthogonal basis function beams; and
wherein causing the apparatus to determine a gain and phase value comprises causing the apparatus to determine a gain and phase value for at least a subset of the basis function beams based on the copy of the sounding signals received via each of a plurality of the basis function beams.

32. The apparatus of claim 25, and further causing the apparatus to:
determine, by the mobile station, a best or most dominant copy of the broadcast control message;
determine, by the mobile station, that the mobile station cannot decode the best copy of the broadcast control message; and
the mobile station being caused to perform the following in response to determining that the mobile station cannot decode the best copy of the broadcast control message:
   determine the combined broadcast control message based on at least the subset of the plurality of the received copies of the broadcast control message and the gain and phase value for each copy of at least the subset of the plurality of the received copies of the broadcast control message; and
   decode the combined broadcast control message.

33. A computer program product, the computer program product comprising a non-transitory computer-readable storage medium and storing executable code that, when executed by at least one data processing apparatus, is configured to cause the at least one data processing apparatus to perform a method comprising:
receiving, by a mobile station from a base station, a plurality of copies of a broadcast information including a broadcast control message, wherein a copy of the broadcast information is transmitted via each of a plurality of basis function beams;
determining, by the mobile station, a gain and phase value for each copy of at least a subset of the plurality of the received copies of the broadcast control message transmitted via different basis function beams; and
determining, by the mobile station, a combined broadcast control message based on at least the subset of the plurality of the received copies of the broadcast control message and the gain and phase value for each copy of at least the subset of the plurality of the received copies of the broadcast control message.

* * * * *